United States Patent [19]

Buehning, Sr.

[11] Patent Number: 5,632,938

[45] Date of Patent: *May 27, 1997

[54] MELTBLOWING DIE HAVING PRESETTABLE AIR-GAP AND SET-BACK AND METHOD OF USE THEREOF

[75] Inventor: Peter G. Buehning, Sr., Short Hills, N.J.

[73] Assignee: Accurate Products Company, Hillside, N.J.

[ * ] Notice: The term of this patent shall not extend beyond the expiration date of Pat. No. 5,580,581.

[21] Appl. No.: 284,549

[22] PCT Filed: Feb. 12, 1993

[86] PCT No.: PCT/US93/01296

§ 371 Date: Jan. 9, 1995

§ 102(e) Date: Jan. 9, 1995

[87] PCT Pub. No.: WO93/15895

PCT Pub. Date: Aug. 19, 1993

Related U.S. Application Data

[63] Continuation-in-part of Ser. No. 835,190, Feb. 13, 1992, abandoned.

[51] Int. Cl.⁶ .................................................. D01D 5/14
[52] U.S. Cl. .................. 264/39; 264/12; 425/7; 425/72.2; 425/186; 425/192.5; 425/378.2; 425/464
[58] Field of Search ............... 425/72.2, 192 S, 425/190, 7, 6, 192 R, 66, 378.2, 382.2, 464, 186; 264/12, 518, 39

[56] References Cited

U.S. PATENT DOCUMENTS 3,354,686  11/1967  Petsch .
3,865,535  2/1975  Langdon et al. .
3,978,185  8/1976  Buntin et al. .
3,981,650  9/1976  Page .
4,652,410  3/1987  Inoue et al. .
4,720,252  1/1988  Appel et al. .
4,818,463  4/1989  Buehning .
4,818,464  4/1989  Lau .
5,080,569  1/1992  Gubernick et al. .
5,145,689  9/1992  Allen et al. .

FOREIGN PATENT DOCUMENTS 54-73916   6/1979   Japan .
3-213549   9/1991   Japan .
2158005    11/1985  United Kingdom .

*Primary Examiner*—Jay H. Woo
*Assistant Examiner*—Joseph Leyson
*Attorney, Agent, or Firm*—Michael de Angeli

[57] ABSTRACT

A metblowing die designed to efficiently receive a preassembled die tip assembly is described. The die assembly includes a die body (19) mounted on a meltblowing machine and a replaceable die tip assembly (20). The die tip assembly (20) includes a mounting block (25), to which are mounted a die tip (26) and air knives (27, 28) on opposite sides or the die tip (26). The positions of the air knives (27, 28) are adjustable to set air gap and set back parameters important in proper operation. The die tip assembly (20) is moved into and out of the die body (19) after air knife adjustment permitting adjustment to be made with the die tip assembly (20) off the machine, allowing rapid replacement. The replacement die tip assembly (20) is preheated, permitting replacement while the die body (19) is still hot.

22 Claims, 6 Drawing Sheets

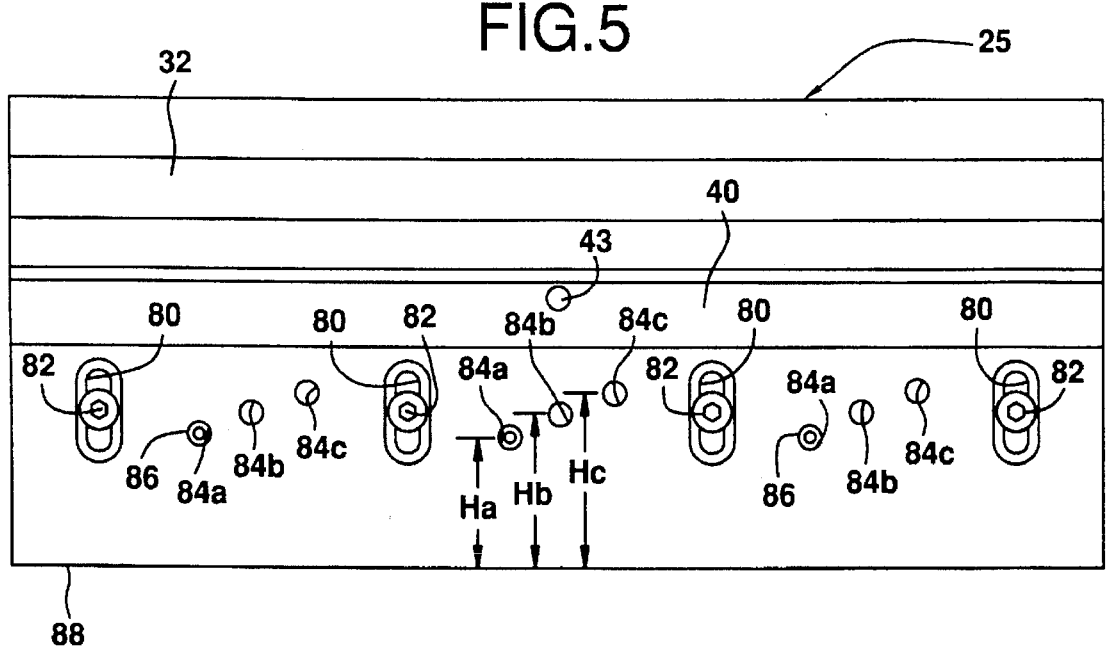
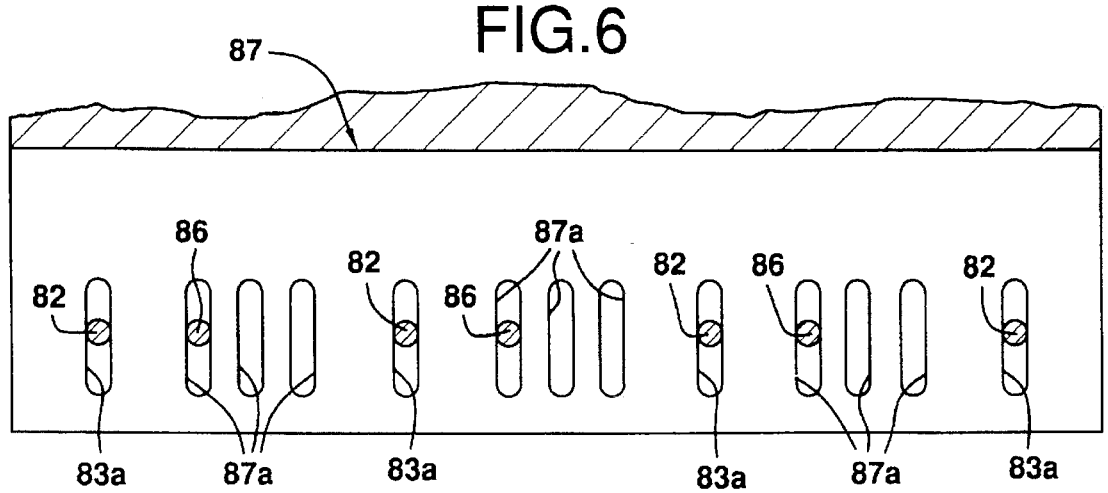
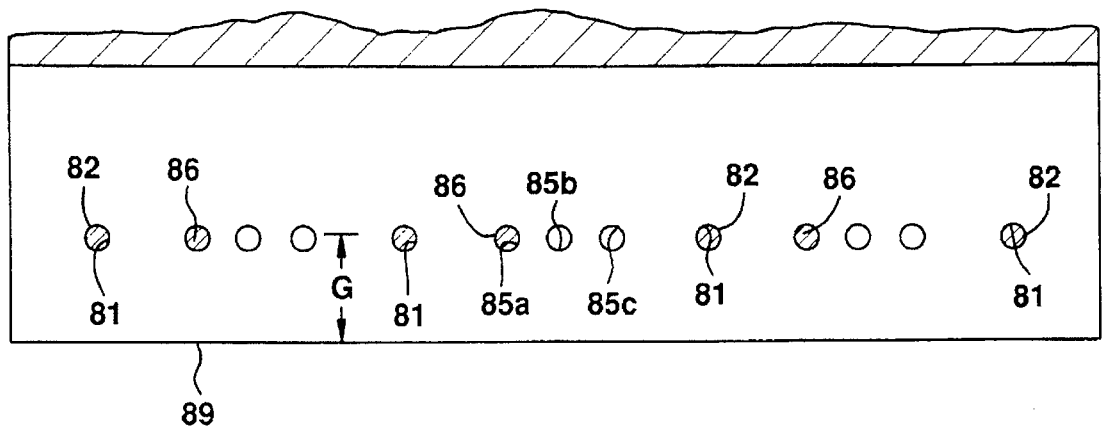

MELTBLOWING DIE HAVING PRESETTABLE AIR-GAP AND SET-BACK AND METHOD OF USE THEREOF

This application is a continuation in part of application Ser. No. 07/835,190, filed on Feb. 2, 1992, now abandoned.

BACKGROUND OF THE INVENTION

1. Field of the Invention

This invention relates generally to meltblowing dies and specifically to a meltblowing die with a replaceable die tip, wherein the air-gap and set-back parameters may be adjusted as desired before replacement. In another aspect, the invention relates to a method of replacing the die tip of a meltblowing die.

2. Discussion of the Prior Art

Meltblowing is a process for manufacturing nonwoven products by extruding a molten thermoplastic polymer resin through a plurality of small orifices to form fine fibers while blowing converging sheets of air onto each side of the orifices to attenuate and draw down the fibers. The extruded fibers are blown onto a moving collector surface where they entangle in a random way to produce a nonwoven fabric or web. The newly formed web is directly withdrawn from the collector for further processing as desired. The overall process is carried out continuously. The webs may be further processed into a number of commercially important products such as filters, fabrics, and battery separators among others. Meltblowing dies are disclosed in U.S. Pat. Nos. 3,978,185, 4,818,463, and 4,986,743.

A key component of a meltblowing die is the die tip. The die tip is an elongate member having an outwardly protruding nosepiece of triangular cross-section terminating in an apex with a row of side-by-side orifices drilled through the apex. A polymer melt is forced through the orifices for extruding the polymer and discharged as side-by-side molten or semimolten fibers. The die tip is generally formed of high quality steel in a separate machining process and fastened to the face of the die body using bolts. Precise machining is required to achieve uniform polymer flow over the length of the row of orifices. The polymer is forced through the die tip orifices by applying very substantial pressure to the molten polymer inside the tip. The internal pressure induces tensile stress in the die tip which tends to concentrate near the apex of the tip and may cause the tip to fail in tension. U.S. Pat. No. 4,986,743 teaches a method for mounting the die tip on the die body with induced compression in the apex region to counterbalance the tensile stress, rendering the die tip more reliable in service. This patent is incorporated herein by reference.

Other important components of the meltblowing die are elongate plates referred to as air knives which, in combination with the die tip nosepiece, form converging air flows to attenuate and draw down the extruded fibers to microsized diameters. The air knives are generally thick elongate plates which have a longitudinal edge tapered to form a knife edge. Conventionally, two air knives are bolted to the die body on either side of the triangular nosepiece of the die tip. The tapered edges of the air knives are aligned with the confronting tapered surfaces of the nosepiece and spaced slightly therefrom to form two air flow channels converging at the apex of the nosepiece, so that the air flowing rapidly past the apex of the nosepiece tends to entrain the fibers being extruded therefrom, and draw the fibers down until they break. The air flow characteristics are determined by the shape and size of the passages formed between the die tip and the air knives, which are defined by parameters known in the art as the "air-gap", the spacing between the confronting surfaces of the triangular nosepiece of the die tip and the air knives, and the "set-back", the vertical distance between the tip of the nosepiece and the outer plane of the air knives. (As used herein, terminology such as "upward", "downward", "vertical", and the like refers to the usual orientation of the die, in which the fibers are extruded downwardly; however, the invention is not to be so limited).

The air-gap and set-back determine the geometry of the converging air flow passages, and thereby influence the air flow properties and the degree of fiber-air interaction. Research has shown that controlling the air flow properties in relation to the polymer flow properties is important for achieving the desired degree of fiber attenuation and final fiber diameter. Research has further shown that the fiber diameter strongly influences the properties of the web such as filtration efficiency.

In typical die designs, the air-gap and set-back are adjustable for selecting the air flow characteristics, to obtain the desired fiber and web product. Meltblowing polymers with different compositions may require different air-gap and set-back. Large meltblowing dies are normally vertically oriented and discharge downwardly onto a moving collector surface such as a conveyor screen or rotating drum.

A common problem in meltblowing occurs when the die tip plugs or structurally fails requiring that the die tip be removed for cleaning or replacement. In a conventional meltblowing die, the die tip and air knives are separate components individually bolted to the face of a die body fixed to the extruding and air supply components. Typical meltblowing die structures are shown in U.S. Pat. Nos. 4,818,463 and 4,986,743. Removal of the die tip generally requires first that each air knife be detached from the die body to gain access to the die tip. In order to remove the air knives, the air knife bolts are removed while the air knives are supported by workers, by cranes or the like. When the bolts have been removed, the air knives may be lowered from the die face and withdrawn from the workspace. The die tip bolts are then removed while the die tip is similarly supported, and the die tip is lowered and withdrawn. For large dies this procedure may be hazardous due to the large weight of the air knives and die tip. For dies employing a large conveyor-type collector, it may not be feasible to move either the die or collector to facilitate replacement of a fouled or damaged die tip; this further complicates the procedure due to the restricted space between the die and collector, forcing the workers to disassemble the air knives and die tip while beneath the die, in some cases being obliged to stand on the collector. These difficult working conditions are further exacerbated by high temperature of the die assembly. More specifically, in typical operation, the die tip and air knives may be at temperatures above four hundred degrees Fahrenheit and the meltblowing line must be shut down for an extended period to allow for cooling before repairs can be made or die tip replacement effected.

Similar difficulties are encountered in the reverse installation procedure, which is further complicated by the necessity of adjustment of the air-gap and set-back after the die tip and air knives have been reattached. If conventional dies are employed, these adjustments must be carried out with the die tip and air knives mounted on the die body. Moreover, the adjustment process involves the steps of mounting the air knives in a first position with respect to the die tip, measurement of the air-gap and set-back, removal of the air knives and reassembly with the air knives at different positions, remeasurement of the air-gap and set-back, and like tedious and repetitive operations, all commonly carried out under very inconvenient working conditions. The result is that often the adjustments are hurried and not made correctly.

SUMMARY OF THE INVENTION

The meltblowing die constructed according to the present invention simplifies the removal and installation of the meltblowing die tip and circumvents many of the difficulties encountered as noted above in use of conventional dies. The invention involves the use of a meltblowing die body designed to efficiently receive a preassembled, preadjusted die tip assembly including a die tip and air knives assembled to a mounting block. The invention may be applied to dies of any size, but is of particular utility for larger dies (e.g., those of fifty inches or longer).

The die tip assembly of the present invention comprises a meltblowing die tip having a triangular nosepiece and air knives mounted on a mounting block. The mounting block with the die tip and air knives mounted thereon in preadjusted relationship is then assembled to a die body. The die body and mounting block include mating passages for the molten polymer and for compressed air, such that the passages are sealed to one another when the mounting block is assembled to the die body.

In a particular embodiment of the invention, the die body defines an open-ended elongate cavity for receiving the preassembled die tip assembly. The die tip assembly is guided into position along longitudinal intermeshing shoulders (e.g., rails or ribs) formed along the cavity walls. In vertically oriented dies, the longitudinal intermeshing shoulders support the weight of the die tip assembly as it slides lengthwise into position within the cavity. In another embodiment of the invention, the die tip assembly is inserted into the cavity in the die body from beneath.

The die tip assembly is secured to the die body by applied forces compressing the back side of the die tip assembly against the confronting back wall of the die body cavity, whereby effective metal-to-metal seals are formed, sealing the mating polymer and air passages to one another. The forces may be applied by threaded bolts or hydraulically activated pistons. Where the die body includes ribs received by grooves in the mounting block, as in the particular embodiment mentioned above, the securing forces may be removed without danger since the weight of the die tip assembly is supported entirely by the ribs of the die cavity. The compressive forces acting on the die tip assembly thus serve to secure the assembly to the die body and to form a fluid seal between the assembly and the die body.

As noted, according to an important aspect of the present invention, the die tip and the air knives are preassembled into their selected respective operating positions on the mounting block before the die tip assembly is installed in the die body. The preassembly step may be accomplished, including pre-setting of the air-gap and set-back to predetermined values, without repetitive adjustment steps. The die tip assembly components will generally be preassembled on a planar work surface and then transported to the die using a cart or crane; in the particular embodiment discussed above, the die tip assembly is then aligned with and slid into the die body cavity. In this embodiment of the invention, the replacement die assembly can be used to push an existing assembly through the opposite open end of the die body cavity for removal.

Because according to the method of the present invention, the die tip assembly is completely adjusted before it is assembled to the die body, the die tip assembly may be preheated to near the meltblowing temperature for direct insertion into a hot die. Preheating the die tip assembly induces thermal expansion in the die tip assembly approximately equal to that in the die body, so that the mating flow passages and other components of the die tip assembly and the die body align properly. Preheating the die tip assembly also prevents thermal stress and buckling or warping of the die tip assembly, which might occur if a cold die tip assembly were inserted into a heated die body.

A specifically designed cart may be employed for efficiently transporting, preheating, installing and removing the die tip assembly. The cart may be equipped with a furnace enclosure for preheating the assembly, an alignment device for aligning the die tip assembly with the die body, and a hydraulic ram or the like for forcing the die tip assembly into or out of the die body. The cart may also include an assembly support surface comprising a roller table or the like for easily delivering and receiving the die tip assembly.

The present invention simplifies the procedure of replacing a fouled, worn or damaged die tip to the point that a hot die tip assembly may be removed and a preheated replacement die tip assembly installed, that is, eliminating the cooling period required before replacing a conventional die, and thus reducing the time required to replace a die tip and decreasing the possibility of personal injury or damaging the die tip during installation or removal. The die tip assembly is preferably secured to the die body using quick release fasteners, for example bolts which need merely be loosened to release the die tip assembly, or hydraulically activated pistons. For replacing a fouled or damaged die tip, the line is momentarily shut down and the old die tip assembly freed. A previously adjusted die tip assembly is then preheated, and slid into the die, displacing the old assembly for removal. The new assembly is secured for operation and the line restarted.

BRIEF DESCRIPTION OF THE DRAWINGS

FIG. 5 is a cross-sectional view taken along the line 5—5 in FIG. 3, illustrating details of the die tip assembly mounting block.

FIG. 6 is a cross-sectional view taken along the line 6—6 in FIG. 3, illustrating details of the assembly spacer plate.

FIG. 7 is a cross-sectional view taken along the line 7—7 in FIG. 3, illustrating details of the air knife assembly.

DESCRIPTION OF THE PREFERRED EMBODIMENTS

Figure 1:
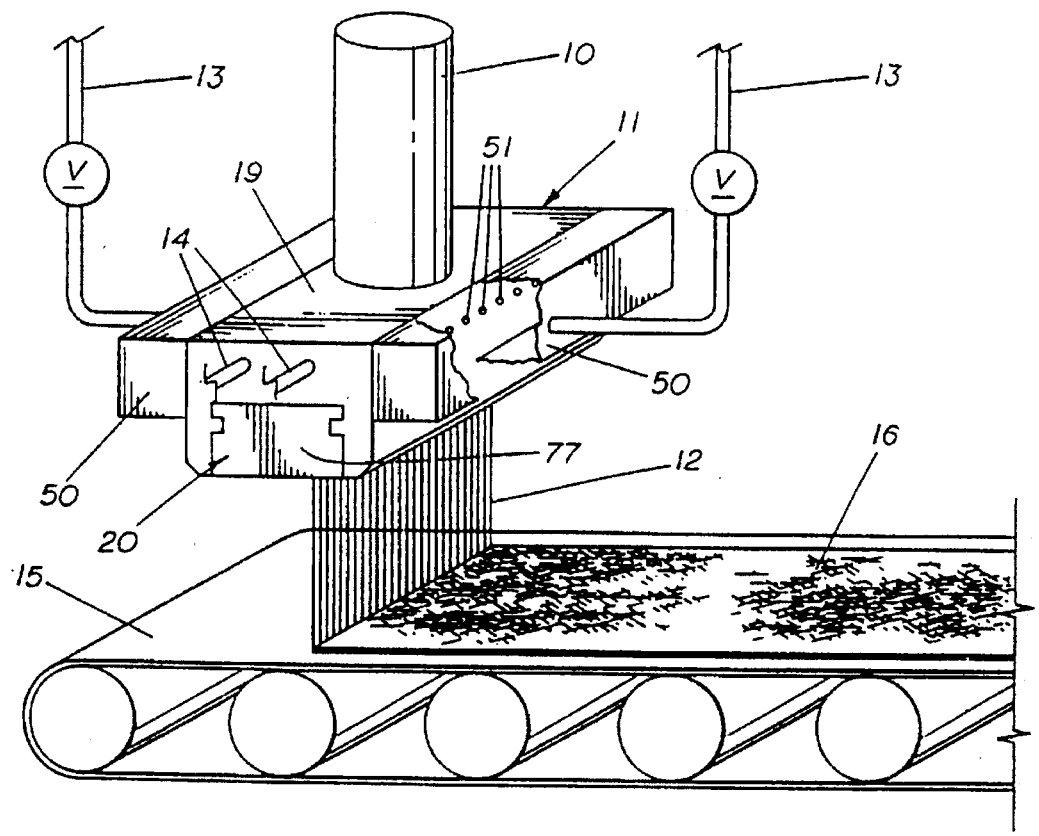
FIG. 1 is a schematic diagram illustrating the main components of a meltblowing resin processing production line, including the meltblowing die assembly constructed according to the present invention.

As shown in FIG. 1, the main components of a meltblowing polymer processing line include an extruder 10, a meltblowing die assembly 11, and a moving collector screen 15. The extruder 10 supplies molten polymer to die assembly 11 which discharges a plurality of side-by-side molten or semimolten fibers into converging air sheets to draw down and attenuate the fibers, forming a fiber/air stream 12. The air is supplied through valved lines 13, and heating elements 14 are provided in the die 11 for heating the polymer. The fiber/air stream 12 flows downwardly onto the moving collector screen 15 where the fibers tend to entangle upon deposit, to form a nonwoven web 16.

The meltblowing die assembly 11 constructed according to the present invention includes a die body 19 and a replaceable die tip assembly 20. The die assembly 11 as illustrated and described herein has a vertical orientation wherein the fibers are discharged downwardly onto an underlying collector 15, as is typical. It is to be understood, however, that use of the terms "vertical", "downwardly", "upwardly" and the like herein and in the claims are merely for reference and clarity in explaining the invention, and are not to be construed as limiting terms. The meltblowing die assembly 11 can have horizontal or intermediate orientations as well.

Figure 2:
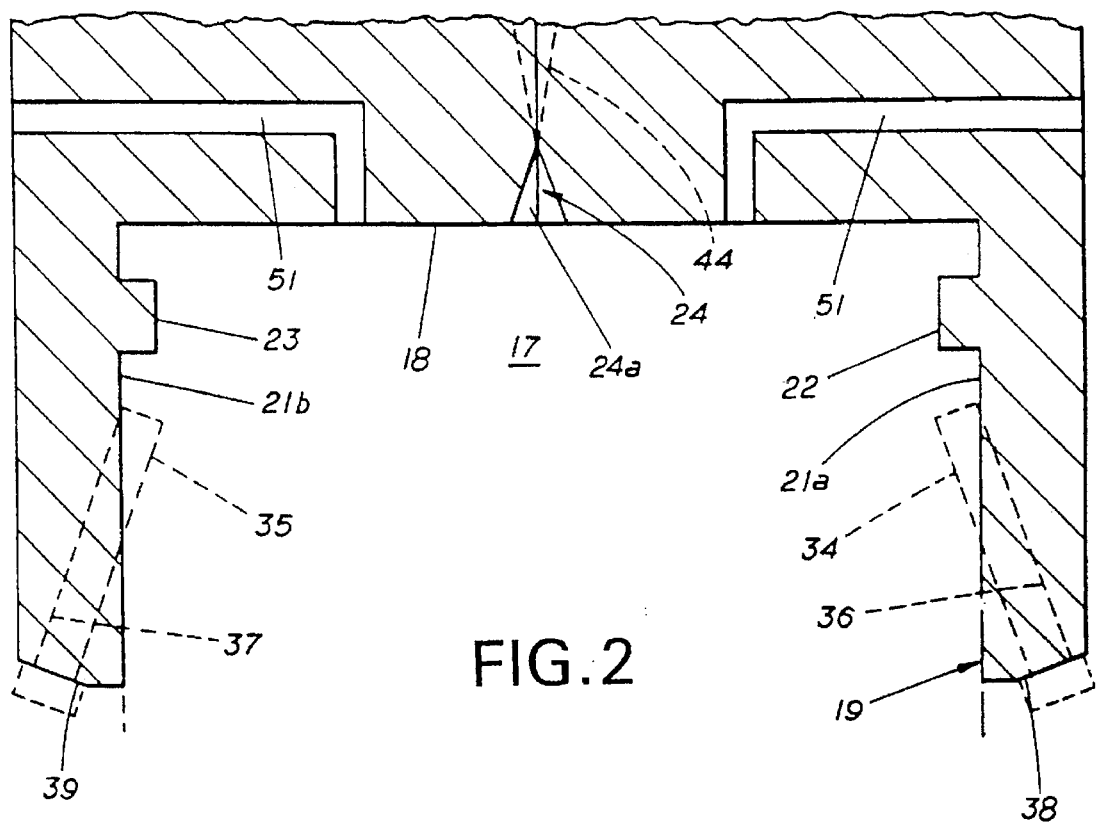
FIG. 2 is a cross-sectional view illustrating details of the die body.
Figure 3:
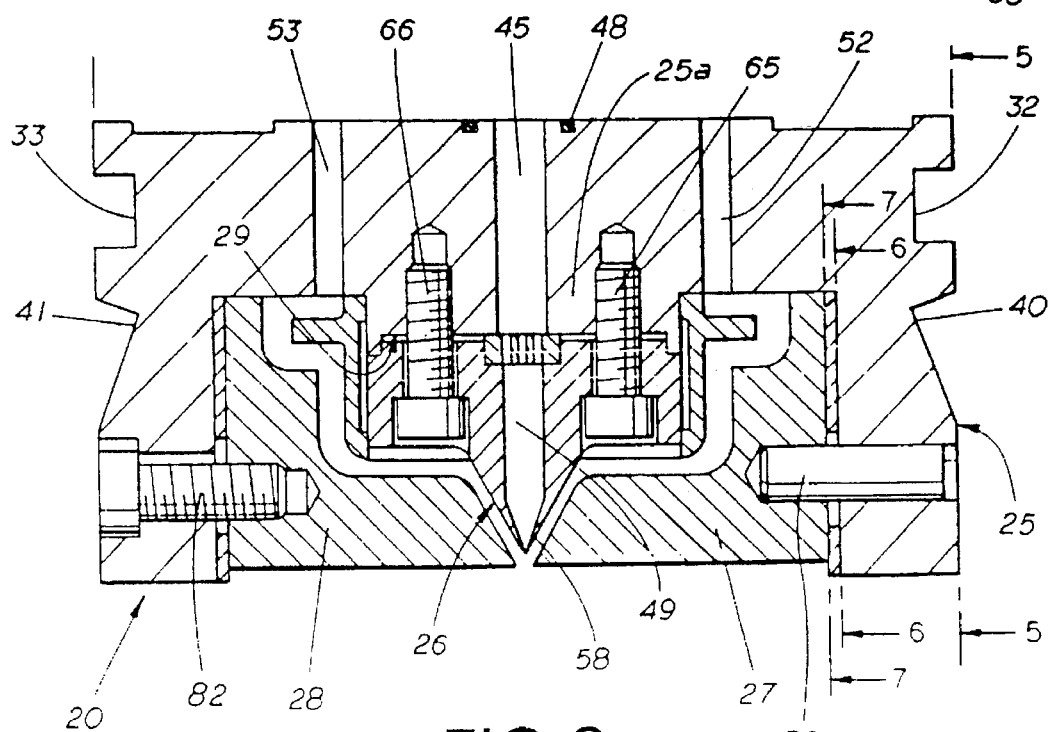
FIG. 3 is a cross-sectional view illustrating details of the die tip assembly.
Figure 4:
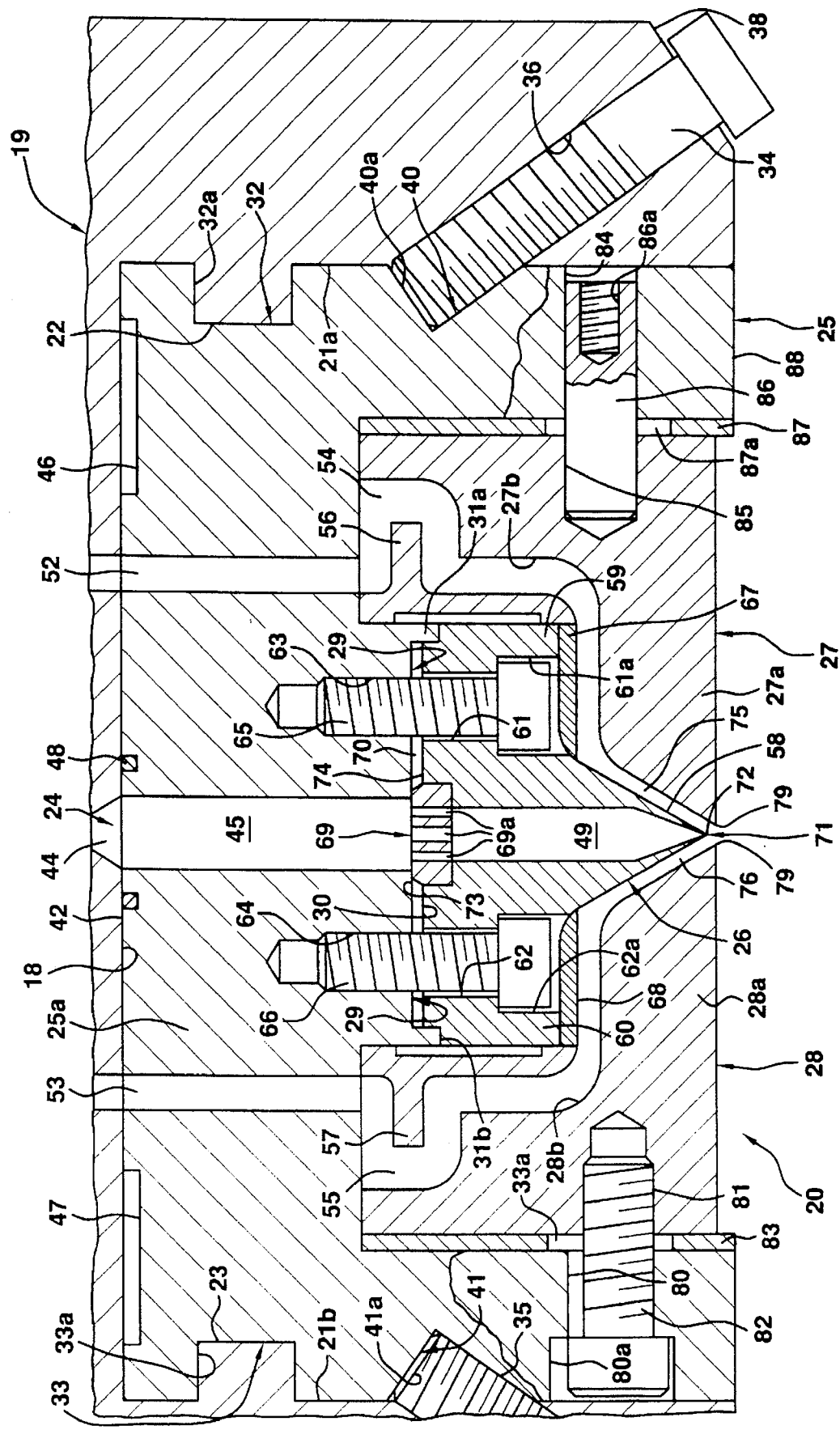
FIG. 4 is a cross-sectional view illustrating the die tip assembly mounted in the die body.

The die body 19 and die tip assembly 20 are separate components as illustrated in FIGS. 2 and 3. FIG. 4 illustrates the two components assembled.

As shown by FIG. 2, the die body 19 has formed therein an elongate cavity 17 defined by downwardly facing bottom surface 18 and inwardly facing side walls 21a and 21b. In a particular embodiment of the invention described first, longitudinally extending ribs 22 and 23 protrude outwardly from the walls 21a and 21b, respectively, and serve to support the die tip assembly 20 as described below. (In a further embodiment of the invention described with reference to FIGS. 10 and 11, ribs 22 and 23 are eliminated. Where not indicated otherwise, these two embodiments are substantially similar.)

The die body 19 has formed therein a polymer flow passage 24 discharging at bottom wall 18. The polymer flow passage 24 may be in the form of a coat hanger die as described in U.S. Pat. No. 4,818,463, and is provided with channel 24a extending along the length of surface 18.

As shown in FIGS. 3 and 4, die tip assembly 20 comprises mounting block 25, die tip 26, and air knives or air plates 27 and 28. Mounting block 25 is preferably in the form of a U-shaped member having a groove 29 formed therein. Die tip 26 is received on raised mounting surfaces 31a and 31b formed on either side of the groove 29. Grooves 32 and 33 formed in opposite sides of mounting block 25 are sized to engage ribs 22 and 23, respectively, of the die body. The block 25 is provided with upwardly facing surface 42.

Referring to FIG. 4, mounting block 25 fits in close conformity in cavity 17 in die body 19, such that the die tip assembly 20 can be moved slidingly lengthwise therein, with elongate die body ribs 22 and 23 engaging mounting block grooves 32 and 33, respectively. The sliding motion of assembly 20 with respect to die body 19 occurs into or out of the plane of FIG. 4. Die body cavity 17 is open at both ends so that die tip assembly 20 may slide into or out of the cavity from either side of die body 19. The present invention contemplates any orientation of the die, although the vertical orientation is preferred. For vertical orientation of the die body 19 (as in FIG. 1), die body ribs 22 and 23 within groove surfaces 32a and 33a, respectively, support the die tip assembly 20.

The die tip assembly 20 is secured to die body 19 by bolts 34 and 35 which act upon mounting block 25 to apply compressive forces urging the upper surface 42 of the mounting block 25 into firm engagement with the lower surface of die body 19. Bolts 34 and 35 are threaded within angled holes 36 and 37 in die body 19. Beveled surfaces 38 and 39 on die body 19 are provided for clearance, but do not frictionally engage the heads of bolts 34 and 35, respectively. The distal ends of bolts 34 and 35 engage longitudinally-extending angled grooves 40 and 41, respectively, formed in opposite sides of mounting block 25 and extending parallel to grooves 32 and 33. Grooves 40 and 41 terminate in flat surfaces 40a and 41a. Accordingly, upon tightening of bolts 34 and 35, an axial upward force is imparted to surfaces 40a and 41a, compressing the upper surface 42 of the assembly mounting block 25 against the confronting bottom surface 18 of die body cavity 17. The compressive force so exerted is sufficient to secure die tip assembly 20 to die body 19 for operation, and to seal mating polymer and air flow passages to one another. The bolts 34 and 35 thus serve as compression rods for applying compressive forces to secure the die tip assembly 20 to the die body 19. Equivalently, hydraulic pistons can be used as compression rods to apply the compressive forces.

The dimensions of grooves 32 and 33 in relation to ribs 22 and 23, respectively, are such as to allow the mounting block to move upwardly and engage the die body upon tightening of bolts 34 and 35, and to allow the die tip assembly to slide along ribs 22 and 23 upon loosening of bolts 34 and 35. Thus, to allow sliding installation or removal of the assembly 20, bolts 34 and 35 need merely be loosened, and need not be fully withdrawn. The weight of die tip assembly 20 is supported on die body ribs 22 and 23.

In practice, multiple bolts 34 and 35 will be spaced along the length of the die, the number of bolts depending on the die length. To facilitate centering the die tip assembly 20 in the die body 19, one of the threaded holes 36 may be provided at the centerline of die body 19 for alignment with a tapered centering hole 43 (see FIG. 5) formed in surface 40a of mounting block 25 for receiving a tapered centering bolt (not shown).

As indicated, die body 19 and mounting block 25 include mating flow passages for molten polymer and for compressed air. More specifically, die body polymer flow passage 24 is in fluid communication with elongate flow passage 45 formed in mounting block 25. Similarly, air passages 51 in the die body 19 mate with air passages 52 and 53 in the mounting block 25.

As mentioned, securing bolts 34 and 35 exert sufficient compressive force to form a metal-on-metal fluid seal between machined planar surfaces 18 of the die body 19 and 42 of the mounting block 25 and establish a fluid seal around the Junction of polymer flow channel 24a and flow passage 45. Recesses 46 and 47 are provided in surface 18 to decrease the contact area between surfaces 42 and 18, and thereby increase and concentrate the compressive stress in the region around the polymer flow passage junction for forming the seal. Although not essential, O-ring 48 may be provided around the Junction to further accomplish the seal.

Mounting block flow passage 45 receives a polymer melt from die body channel 24a and conducts the molten polymer to flow passage 49 formed in die tip 26. Flow passage 45 extends substantially the length of mounting block 25 and may be longitudinally continuous or may comprise an in-line series of shorter elongate passages closely spaced over the length of the mounting block, for improved mechanical strength. For long dies, the latter configuration is preferred, to increase the structural integrity of the mounting block. The end enclosures of polymer passage 45 are formed by end walls 77 and 78 (see FIGS. 1 and 9) of mounting block 25, while end enclosures of polymer passage 49 are defined by end walls of die tip 26. The outer periphery of end plates 77 and 78 are sized to allow assembly 20 to be slidingly moved into or out of die body cavity 17 with the end plates attached, such that end plates 77 and 78 are considered to be components of die tip assembly 20.

Air flow passages 51 formed on opposite sides of die body 19 register with air passages 52 and 53, respectively, formed in mounting block 25. The compression of assembly surface 42 onto surface 18 by securing bolts 34 and 35 establishes metal-to-metal fluid seals at the junctions of the air flow passages, as has been described in relation to polymer flow passages 44 and 45.

Die tip 26 and air knives 27 and 28 define converging air channels 75 and 76. Air supplied through passages 51 in the die block 19 flows through passages 52 and 53 in the mounting block 25 and then through passages 54 and 55, respectively, formed between the air knives 27 and 28 and the die tip 26. The air flow passages 52 and 53 are preferably in the form of a plurality of holes spaced along the length of the mounting block 25 to provide uniform distribution of air along the die tip 26, and register with a like number of air passages 51 in the die body 19. Air deflector plates 56 and 57 are provided to induce mixing of air discharged from the plurality of air passages 52 and 53, and thereby achieve a uniform air flow along the length of air passages 54 and 55, respectively. Deflector plates 56 and 57 may be secured to flanges 59 and 60 of the die tip 26 by bolts (not shown).

The die tip assembly of the present invention preferably employs the die tip mounting technique disclosed in U.S. Pat. No. 4,986,743 (incorporated herein by reference). Although this die tip mounting technique is preferred, other die tip mounting techniques may also be used without departing from the present invention.

As best seen in FIGS. 3 and 4, die tip 26 is an elongate member having a protruding triangular nosepiece 58 and flanking flanges 59 and 60. Clearance holes 61 and 62 in the flanges 59 and 60 are counterbored at 61a and 62a at one end, and aligned with threaded holes 63 and 64, respectively, in the mounting block 25 to receive bolts 65 and 66, securing die tip 26 to mounting block 25. Cover plates 67 and 68 cover the counterbored holes 61 and 62, and are attached to die tip flanges 59 and 60 using bolts (not shown).

Polymer flow passage 49 formed in die tip 26 is in fluid communication with mounting block flow passage 45. The polymer flow passage extends through flow distribution plate or "breaker plate" 69. Breaker plate 69 contains a plurality of smaller holes 69a which serve to distribute the polymer flow uniformly over the length of the die tip flow passage 49. On one side, breaker plate 69 fits in close conformity in a groove 74 formed in die tip 26. On the opposite side, breaker plate 69 confronts the mounting block 25 along a portion of surface 30. As taught by U.S. Pat. No. 4,986,743, the dimensions of breaker plate 69 in relation to groove 74 are such that as the die tip mounting bolts 65 and 66 are tightened, metal-on-metal fluid seals are established between breaker plate 69 and confronting surface 30 on one side of the breaker plate, and between breaker plate 69 and the confronting bottom surface 73 of groove 74 on the other side, thereby establishing a fluid seal extending between polymer flow passages 45 and 49.

Die tip nosepiece 58 protrudes outwardly and terminates at apex 71. One or more rows of equally spaced orifices 72 are drilled through the apex. The spacing of the orifices is usually between 10 to 40 orifices per inch and the orifice diameters are generally between 0.010 to 0.025 inches. Accordingly, the pressurized polymer melt flows through passages 44 and 45, through breaker plate 69, into die tip passage 49, and through orifices 72, being discharged as a plurality of side-by-side molten or semimolten fibers.

The internal pressure in polymer flow passage 49 tends to induce a tensile stress in the tip which concentrates at the apex 71 of the nosepiece 58 and may cause the tip to fail in tension. Mounting of the die tip in accordance with U.S. Pat. No. 4,986,743 applies a compressive stress in the apex region of the nosepiece which counterbalances the tensile stress, thereby reducing the resultant operating stress in the nosepiece, and improving its reliability in use.

Thus, in accordance with the teachings of U.S. Pat. No. 4,986,743, breaker plate 69 is fully received in groove 74 and die tip 26 is positioned on raised shoulders 31a and 31b on the mounting block 25. The upper surface 73 of breaker plate 69 confronts the surface 30 of mounting block 25 surrounding flow cavity 45. With the die tip 26 positioned on the shoulders 31a and 31b, but not firmly bolted in place, the breaker plate 69 and die tip 26 are both spaced from mounting block 25. Upon tightening bolts 65 and 66 to the fully stressed position, the die tip 26 undergoes a small inward deflection, with shoulders 31a and 31b acting as fulcrums. The spacing between surface 73 of breaker plate 69 and surface 30 of mounting block 25 is reduced to zero as the surfaces are interfaced in tight compression, while the spacing 70 between surface 74 of the die tip 26 and surface 30 of the mounting block 25 remains greater than zero. The compression of the surface 73 of breaker plate 69 onto 30 seals polymer flow passages 45 and 49 as described above. The inward deflection of the die tip 26 induces a compressive bending moment concentrated in the apex region of the nosepiece 58. The resultant compressive stress in the apex counterbalances, in part, the tensile stress induced by internal pressure in flow passage 49 during operation.

Employment of the teachings of U.S. Pat. No. 4,986,743 as thus described requires that the die tip 26 be formed as a separate member bolted to mounting block 25. While as indicated this construction technique is preferred, it is within the scope of the present invention to form the die tip integrally with the mounting block 25.

Air knives 27 and 28 are elongate plates with inner surfaces 27b and 28b, respectively, contoured in general conformity with confronting surfaces of die tip 26 and spaced therefrom to form flanking air flow passages 54 and 55, respectively. Air knives 27 and 28 have inwardly projecting flanges 27a and 28a which terminate in spaced apart edges 79, and, in combination with confronting die tip nosepiece 58, form converging air flow passages 75 and 76. The width of passages 75 and 76, that is, the spacing of air knife edges 79 from the apex 71 of the nosepiece, is the parameter known to the art as the "air-gap". Air supplied on opposite sides of the die 11 via lines 13 flows through air chambers 50 (see FIG. 1), through passages 51, passages 52 and 53, passages 54 and 55, and into converging air flow passages 75 and 76. The angle of convergence of the airstreams flowing from passages 75 and 76 is defined by the internal angle of nosepiece 58, and is typically between 45 to 90 degrees. Passages 75 and 76 discharge converging air sheets onto opposite sides of die tip orifices 72 to attenuate and draw down the fibers issuing therefrom and to form a fiber/air stream 12.

The positions of air knives 27 and 28 in relation to die tip 26 are adjustable vertically and horizontally for controlling the flow properties of the converging air sheets discharging from flow passages 75 and 76. The air flow properties are determined by the air-gap, dimension E in FIG. 8, and the set-back, dimension F, which parameters in turn are determined by the positions of the air knives 27 and 28 with respect to the nosepiece of die tip 26. As noted, the "air-gap"E is the width of air flow passages 75 and 76, while the "set-back"F is the vertical distance between the knife edges 79 of the air knives and apex 71 of the die tip. Each air knife 27 and 28 will usually be positioned at the same air-gap and set-back on opposite sides of the apex. The proper air-gap and set-back settings depend on the composition of the polymer melt being processed, the desired web properties, the size of the die, and like process variables. For meltblowing polypropylene, the air-gap is typically between 0.010 to 0.100 inches and the set-back is between −0.020 to +0.100 inches. As mentioned above and described in detail below, according to an important aspect of the invention, the air-gap and set-back may be preset before the die tip assembly is assembled to the die body 19 for use.

According to one aspect of the invention, plural discrete selectible options are provided for the vertical relation of the air knives 27 and 28 to die tip 26, while the lateral position of air knives 27 and 28 is adjusted by selection of appropriate spacer plates 83, 87 between air plates 27 and 28 and mounting block 25. The air-gap and set-back parameters are functions of these relative vertical and lateral positions. Conveniently, the user is supplied with a table which may be consulted to determine the desired vertical position and spacer plate thickness for various combinations of desired air-gap and set-back parameters. The selected air-gap and set-back parameters can then be preset by appropriate assembly of the air plates to the mounting block, that is, before insertion of the die tip assembly 20 into cavity 17 in die body 19.

As shown in FIGS. 4 and 5, mounting block 25 is provided with a plurality of vertical slots 80 counterslotted at 80a to receive air knife securing bolts 82 threaded into holes 81 in air knives 27 and 28. For clarity, the configuration is shown for air knife 28 only. Air knife 27 is provided with securing means of the same design. Air knife 28 is thus secured to mounting block 25 by bolts 82, and is spaced a selectible distance therefrom by spacer plate 83. Counter-slots 80a are provided so that the heads of bolts 82 will not interfere with the sliding of assembly 20 into die body cavity 17, and to allow vertical adjustment of the position of air plate 28 with respect to mounting block 25. Spacer plate 83 is provided with aligned slots 83a for the passage of bolts 82 therethrough. For any particular set-back of the air knife, the thickness of the spacer plate 83 determines the air-gap between the air knife and die tip nosepiece 58. Upon tightening bolts 82, the air-gap is set positively since no further adjustments are needed for operation. Spacer plates of specified thickness can be interchanged to obtain the desired air-gap; as noted, according to an important aspect of the invention, this procedure is completed prior to the installation of the die tip assembly 20 in die body 19.

The set-back adjustment means is shown in FIGS. 4 through 7 for air knife 27 only; in practice air knife 28 will also be provided with a set-back adjustment means of the same design. Mounting block 25 has a plurality of sets of vertically and laterally spaced dowel pin holes 84a–84c in alignment with a like number of sets of vertically aligned and laterally spaced dowel pin holes 85 in air knives 27 and 28 for receiving dowel pins 86. See FIGS. 5–7. By inserting dowel pins 86 in appropriate ones of holes 84a–84c in block 25 and holes 85 in air knives 27 and 28, the vertical positions of air knives 27 and 28 are fixed with respect to block 25. Air-gap spacer plate 87 (identical to spacer plate 83) is provided with sets of aligned slots 87a (see FIG. 6) to permit dowel pins 86 to pass therethrough. The length of dowel pins 86 is such that when fully inserted, the outer free ends of the pins 86 do not interfere with the sliding of die tip assembly 20 into die body 19. Dowel pins 86 are provided with threaded holes 86a for receiving a threaded pull out means for withdrawing pins 86.

Figure 8:
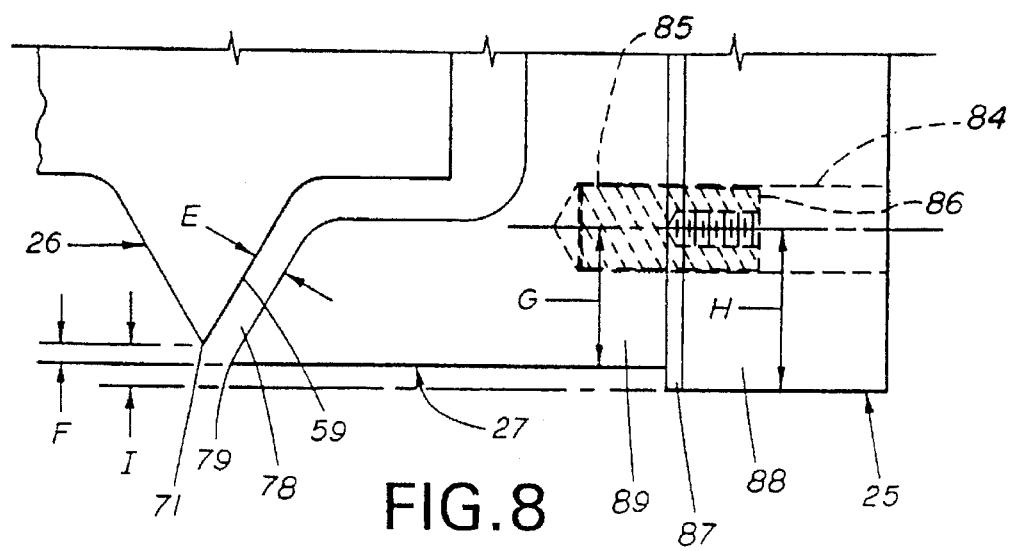
FIG. 8 is a dimensioned side view of the die tip assembly for defining the set-back.

With the dowel pins 86 installed in the corresponding ones of holes 84a–84c and 85a–85c, air knife 27 is spaced vertically from die tip nosepiece 58 by a desired set-back (dimension F in FIG. 8). Thus, upon tightening air knife securing bolts 82, the set-back of the air knives 27 and 28 is set positively; again, according to an important aspect of the invention, this procedure is accomplished before installing die tip assembly 20 in die body 19.

For the purpose of describing the adjustable set-back means of the present invention, dimensions G, H, and I are identified in FIG. 8 with reference to air knife 27. The set-back, F, is related to dimensions G, H, and I as follows: F=I−(H−G). According to the invention, G is fixed, in that the holes 85 bored in the air knives 27 and 28 are vertically aligned, lying along a horizontal line, and I is fixed, in that the position of the die tip 26 with respect to the mounting block 25 is not adjustable. For fixed values of G and I, the set-back of air knife 27 can be varied by varying the dimension H (i.e., by choosing a desired mounting block dowel pin hole 84). The present invention provides for adjustable set-back by providing sets of dowel pin holes 85a–85c drilled in the air knives 27 and 28 at a fixed value of dimension G, and a like number of sets of dowel pin holes 84a–84c drilled in mounting block 25 at differing predetermined values of the dimension H above a reference line. For setting the desired set-back, for example, of air knife 27, the air knife is moved vertically until one of the air knife holes 85a–85c in each set thereof is aligned with the desired one of the mounting block holes 84a–84c in each set thereof, and the dowel pins 86 are inserted therethrough. Thus, dowel pin holes 84 as illustrated in FIGS. 4 and 8 represent ones of a number of sets of selectible mounting block dowel pin holes 84a–84c, each hole determining a different value of the dimension H.

FIGS. 5, 6 and 7 illustrate the details of the adjustable set-back means, and the interrelationship between the mounting block 25 (FIG. 5), the spacer plate 87 (FIG. 6), and the air knife 27 (FIG. 7). The cutting plane of each Figure is indicated in FIG. 3 as planes 5—5, 6—6, and 7—7, respectively. Mounting block 25 is provided with multiple dowel pin holes 84a, 84b, and 84c, which are grouped on the basis of their centerline distances Ha, Hb, and Hc, respectively, from the lower surface of mounting block 88. The holes 84a–84c are arranged in a repeated pattern along the length of the mounting block; the number of holes in each set will depend on the number of desired set-back positions to be provided, while the number of sets of holes will depend on the length of the die. The holes are staggered laterally over the length of the die, as opposed to being drilled in-line vertically (i.e. along lines perpendicular to lower surface of block 88), because the vertical spacing of the holes (e.g., Ha minus Hb) is small relative to the diameters of the holes themselves. FIG. 5 illustrates a die tip assembly with three allowable set-back settings, each setting corresponding to a particular group of dowel pin holes. More possible set-back values can be provided in the same general way. Thus, it can be seen that a plurality of selectible discrete vertical positions of the air plates with respect to the nosepiece are defined by a plurality of sets of vertically and laterally spaced holes 84a–84c in the mounting block cooperating with a like plurality of sets of vertically aligned and laterally spaced holes 85a–85c in the air plates.

Air knife 27 has dowel pin holes 85a, 85b and 85c which are grouped on the basis of their longitudinal alignment with mounting block dowel pin holes 84a, 84b, and 84c, respectively. The air knife holes 85a, 85b and 85c are vertically aligned, that is, are spaced along a line parallel to the lower planar surface of the air knife 89 and spaced a distance G therefrom. Due to the staggered vertical position of the mounting block dowel pin holes 84a–84c, it is not possible for more than one group of the air knife holes 85a–85c to be simultaneously aligned with its respective group of mounting block holes 84a–84c over the entire length of the assembly. Thus for receiving the dowel pins 86, only one of the following combinations is possible: holes 85a will align with holes 84a, holes 85b will align with holes 84b, or holes 85c will align with holes 84c. Once a particular alignment is made and the dowel pins inserted therein, the set-back is determined. The mounting block holes and the air knife holes are drilled with low clearance for receiving the dowel pins snugly, ensuring good alignment over the length of the assembly. The variation In the air-gap and set-back over the die length is generally less than ±0.002 inches.

If dowel pins 86 are removed and bolts 82 loosened, air knife 27 can be moved vertically with bolts 82 sliding along slots 80, while bolts 82 maintain longitudinal alignment of the mounting block and air knife. In this way, the air knife can be moved until the desired group of mounting block dowel pin holes 84a–84c (corresponding to the desired set-back) aligns with the respective group of air knife holes 85a–85c, and the dowel pins 86 may then be inserted therein. Securing bolts 82 are tightened to positively set the set-back and secure the air knife for operation. Spacer plate 87 has multiple slots 83a and 87a in alignment with the bolt holes and dowel pin holes for allowing the bolts and dowel pins to pass therethrough, respectively.

Referring to FIG. 8, it can be seen that for any particular thickness of spacer plate 87, decreasing the set-back, F, will also decrease the air-gap, E, while increasing the set-back increases the air-gap. Therefore, for a particular set-back, there is a unique spacer thickness which will provide the desired air-gap. For each of the allowable set-back settings, the variation in air-gap with respect to the spacer plate thickness is known from the engineering design analysis. The data relating various dowel pin locations and shim thickness values to various combinations of air-gap and set-back parameters can be supplied to the user in tabular form to simplify setting of the desired air-gap and set-back. Notice further that the set-back position is determined completely by selection of mounting block dowel pin holes occupied by the dowel pins, so that the set-back can be visually verified, without physical measurements.

Figure 9:
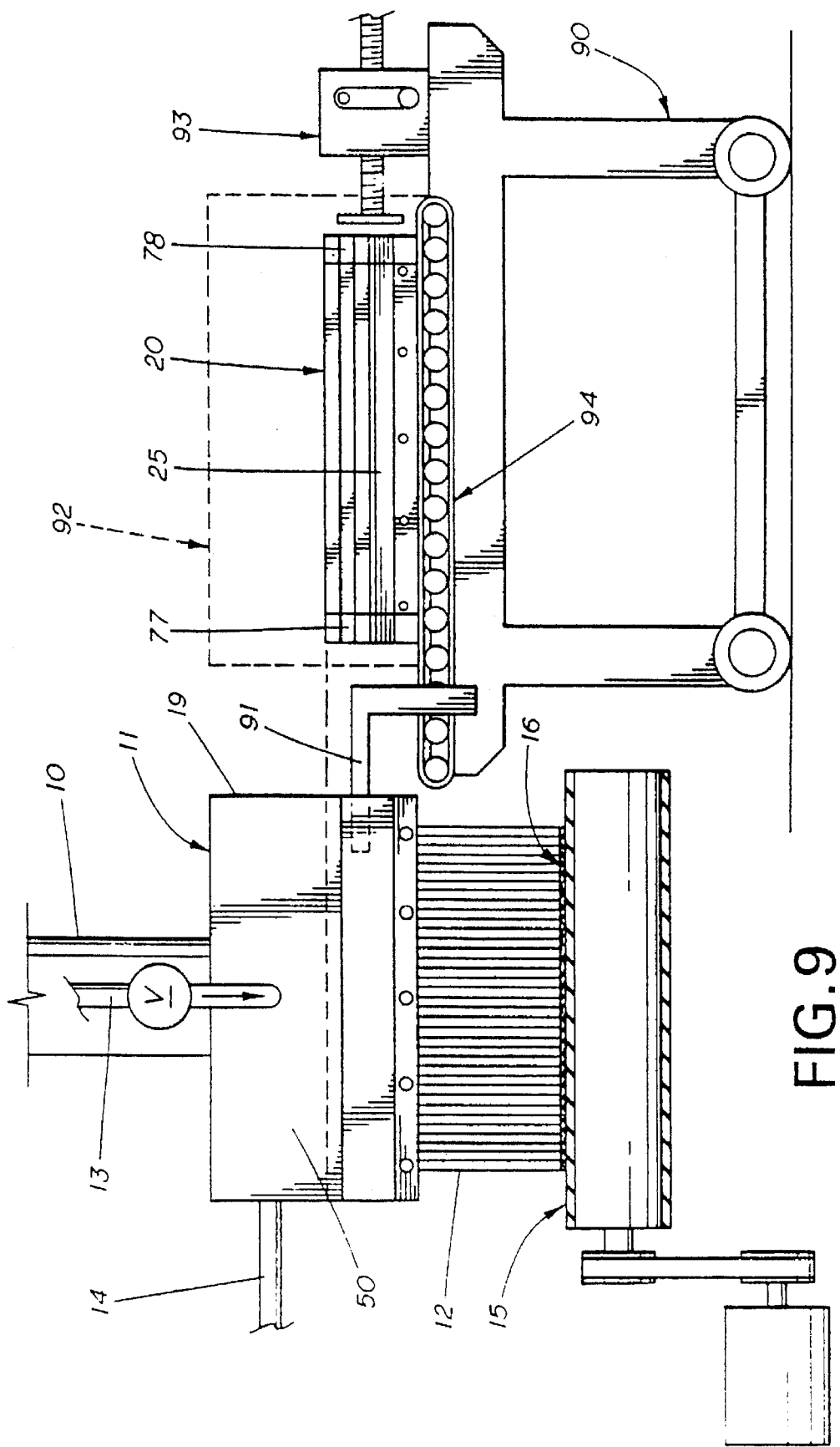
FIG. 9 is a side elevational schematic diagram illustrating a meltblowing polymer processing line having a vertical die, together with a cart carrying a replacement die tip assembly.

FIG. 9 illustrates a vertically oriented die body 19 prepared to receive the die tip assembly 20 of the present invention. The die tip assembly 20 will generally be preassembled on a planar work surface with the air-gap and set-back set to desired values, as described. The assembly will then be transported to the meltblowing processing line for installation. To facilitate this operation, a specially designed cart 90 may be provided, comprising an aligning guide for aligning the die tip assembly 20 with die body cavity 17, heating enclosure 92 (such as a furnace), ram 93, and roller surface 94. The aligning guide may comprise aligning rods 91 mating with aligning holes drilled in the end wall of the die body 19. For efficiently replacing a fouled or damaged die tip assembly, the line will be momentarily shut down and bolts 34 and 35 will be loosened but need not be fully removed to free the die tip assembly to be replaced. The angular orientation of bolts 34 and 35 improves accessibility thereto. The air-gap and set-back of the replacement die tip assembly 20 are preset to provide the preferred airflow characteristics. The replacement die tip assembly is preheated to a temperature comparable to that of the die tip assembly to be replaced, typically while oriented face-down on roller surface 94. Aligning rods 91 are then inserted into the die body alignment holes, such that grooves 32 and 33 formed in the mounting body 25 are aligned for engaging die body ribs 22 and 23 as has been described. Ram 93 is employed for sliding assembly 20 into the cavity of die body 19; roller surface 94 facilitates delivering the assembly from the cart 90 to the die body 19. Heating enclosure 92 may comprise a gas or electric furnace for preheating the assembly 20 before direct insertion into a hot die body 19. For receiving the die assembly being displaced through the opposite end of the die cavity as has been described, a similar cart 90 would be placed on the opposite side of the die 11. The new die tip assembly is then secured to the die body to form a fluid seal therebetween as has been described. The line will be restarted and production resumed. To further simplify the replacement procedure, bolts 34 and 35 may be replaced with quick release connectors such as hydraulically activated pistons. The pistons can be deactivated simultaneously to free the old assembly and reactivated simultaneously for securing the new assembly to the body and for forming the fluid seals.

A problem in the replacement procedure may arise due to the dribbling of molten polymer from die body flow passage 24 after the line has been shut down. Any residual material which lodges between sealing surfaces 42 and 18 will resist the compression of the mating surfaces upon tightening of bolts 34 and 35, and may result in failure of the seal therebetween. Therefore, it would be undesirable for any polymer dribbling from die body 44 to flow into the space separating surfaces 42 and 18 as a replacement assembly slides into position. This possibility is precluded by the present invention; grooves 32 and 33 in the mounting block 25 engage ribs 22 and 23 such that the end wall of the mounting block 25 is Juxtaposed to the end wall of the die body as the die tip assembly slides into the die body, effectively "shaving" off any dripping polymer. As the die tip assembly slides further into position, passage 45 is in general alignment with polymer flow passage 44, so that substantially any polymer dribbling from passage 44 will flow into passage 45, and will not be collected on the mating surfaces of the mounting block 25 and die body 19. A small amount of polymer dribbling into passage 45 is acceptable when executing a normal assembly replacement procedure.

Figure 10:
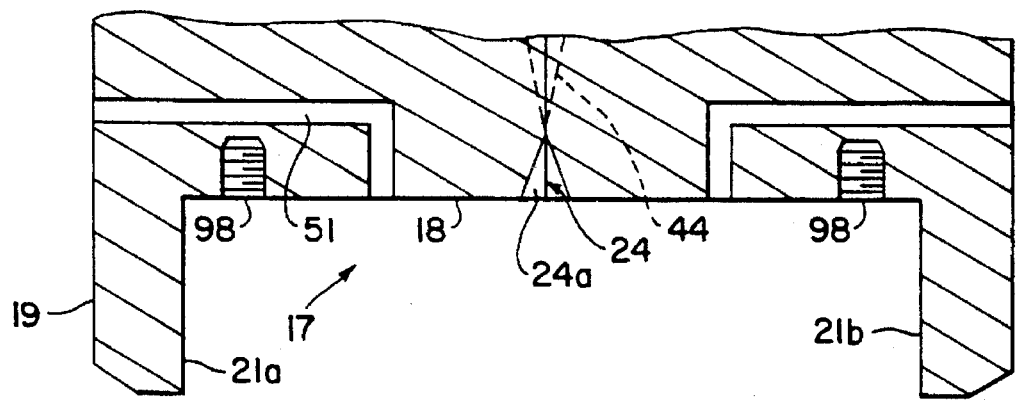
FIG. 10 is a view comparable to FIG. 2, illustrating the die body in an alternative embodiment of the invention.
Figure 11:
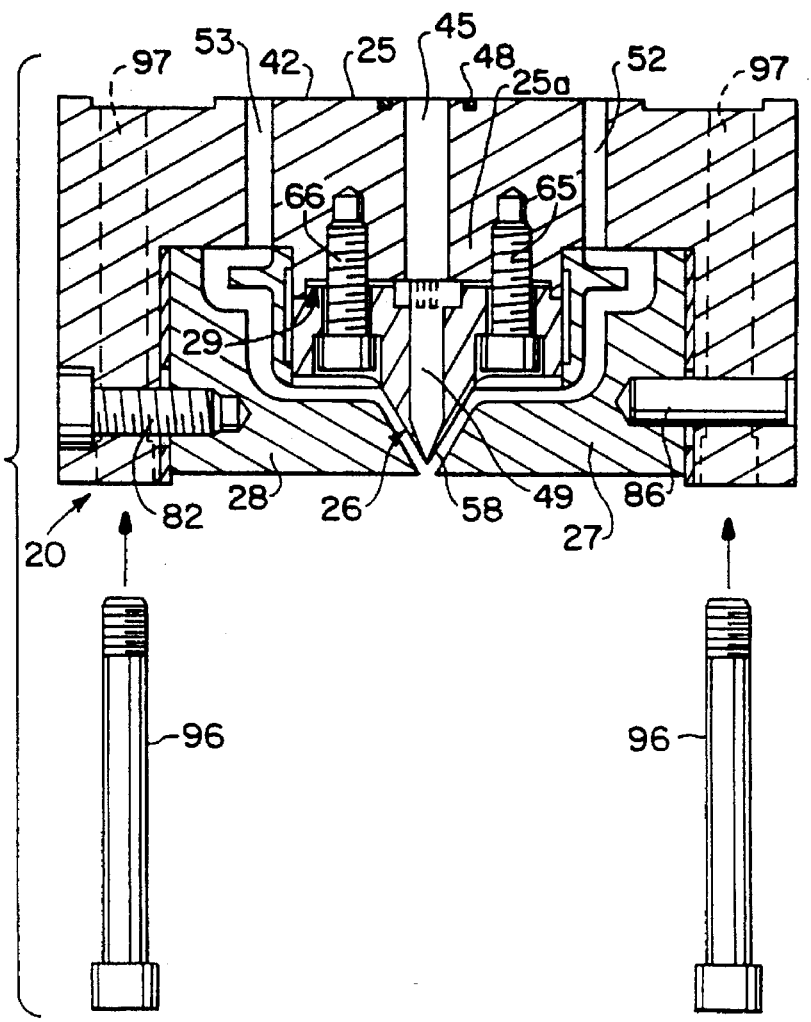
FIG. 11 is a view comparable to FIG. 3, illustrating the die tip assembly in the alternative embodiment of the invention.

FIGS. 10 and 11 illustrate a further embodiment of the invention, wherein a replacement die assembly is lifted into the cavity 17 in the die body from beneath, rather than being slid in from one end, as in the embodiment described above. Accordingly, the ribs 22 and 23 in the die body cavity 17 and the cooperating grooves 32 and 33 in the mounting block 25 are eliminated. In the embodiment of FIGS. 10 and 11, the mounting block 25, having had die tip 26 and air knives 27 and 28 assembled thereon in preadjusted relationship to one another to preset the desired air-gap and set-back parameters, is lifted into cavity 17 and secured therein by mounting bolts 96 extending through bores 97 in mounting block 25 and threaded into die body 19. As above, bolts 96 thus secure the die tip assembly within the die body 19 and ensure the integrity of the air and polymer passages formed therebetween.

It is anticipated that the embodiment of FIGS. 10 and 11 may find use where the collector 15 may be readily moved from beneath the die body; under these circumstances, it may be more convenient to lift the replacement die tip assembly into the die body from beneath than to slide it into place from one end thereof.

The die assembly according to the present invention is used in practice of a corresponding method of the invention, that is, rapid and efficient replacement of a die tip, while permitting the important air-gap and set-back parameters to be set and allowing the die tip assembly to be heated near operating temperature prior to assembly of the die tip and air knives to the die body. Similarly, a method of forming a meltblown polymer product comprises the steps of:

(a) extruding a molten polymer through the orifices of the die tip at a meltblowing operating temperature;

(b) adjusting a replacement die tip to provide desired air-gap and set-back values;

(c) preheating the replacement die tip to substantially the same temperature (e.g., within 10 degrees Fahrenheit) as the die tip assembly to be replaced;

(d) discontinuing the extrusion of the molten polymer;

(e) moving the die tip out of the die assembly;

(f) moving the replacement die tip into the die assembly; and (g) recommencing extrusion of the polymer.

Die tip replacement according to the invention may be carried out at elevated temperatures (e.g., 400 degrees Fahrenheit and above) without waiting for the die to cool down to room temperature. Even at 250 degrees Fahrenheit thermal expansion resulting from inserting a die tip at room temperature could present problems. The problem of thermal expansion, however, is more serious at 350 degrees Fahrenheit and above. It is preferred to preheat the die to within fifty degrees, and preferably 25 degrees of the operation temperature. It is also preferred to replace the die before it has cooled more than 50 degrees Fahrenheit.

In a preferred method, the die tip is replaced while maintaining the die assembly at operating temperature, that is, the die heaters 14 are not shut off during die tip replacement.

Thermoplastic materials suitable for the process of the invention include any thermoplastic useable in meltblowing. These include polyolefins including homopolymers, copolymers (e.g., EVA), terpolymers, etc. Other suitable materials include polyesters such as poly(methylmethacrylate) and poly(ethylene terephthate); polyamides such as poly (hexamethylene adipamide), and poly(omega-caproamide), and poly(hexamethylene sebacamide); polyvinyls such as polystyrene. Other polymers may also be used, such as nylon, polytrifluorochloroethylene, polyurethanes, polycarbonates, silicones, pitch, and blends thereof. The polyolefins are preferred. These include homopolymers and copolymers of the families of polypropylenes, polyethylenes, and other high polyolefins. The polyethylenes include LDPE, HDPE, LLDPE, and very low density polyethylene.

A broad range of process conditions may be used according to the process of the invention depending upon the thermoplastic material chosen and the type of web/product properties needed. Any operating temperature of the thermoplastic material is acceptable so long as the material is extruded from the die so as to form a nonwoven product. An acceptable range of temperature for the thermoplastic material in the die, and consequently the approximate temperature of the die head around the material, is 350 degrees Fahrenheit to 900 degrees Fahrenheit. A preferred range is 400 degrees Fahrenheit to 750 degrees Fahrenheit. For polypropylene, a highly preferred range is 400 degrees Fahrenheit to 650 degrees Fahrenheit.

Any operating temperature of the air in the air knife is acceptable so long as it permits production of useable nonwoven product. An acceptable range is 350 degrees Fahrenheit to 900 degrees Fahrenheit.

The flow rates of thermoplastic and air may vary greatly depending on the thermoplastic material extruded, the distance of the extrusion head from the collector device, and the temperatures employed. An acceptable range of the ratio of pounds of air to pounds of polymer is about 20–500, more commonly 30–100 for polypropylene. Typical polymer flow rates vary from about 0.3–1.5 grams/hole/minute, preferably about 0.5–1.0.

While several preferred embodiments of the invention have been described in detail, these are not to be considered limiting on the invention, which is limited only by the following claims.

What is claimed is:

1. A meltblowing process including the step of replacing a die tip assembly in use with a preadjusted die tip assembly, comprising the steps of:

providing a meltblowing machine, comprising in use:

(i) an elongated die body having a coathanger-shaped polymer flow passage formed therein, an upper inlet end of said coathanger-shaped polymer flow passage being connected to a source of polymer to be meltblown, and a lower discharge end of said coathanger-shaped polymer flow passage forming an elongate polymer flow port in a lower surface of said die body, said die body further having air flow passages disposed on either side of said polymer flow passage, and said die body being adapted to receive heaters for heating said polymer and air, and (ii) a die tip assembly, the machine further comprising a replacement die tip assembly, said die tip assembly in use and said replacement die tip assembly each comprising:

(a) an elongated mounting block having an upper surface for mating with and being secured to said lower surface of said die body, such that polymer and air flow passages formed in said mounting block mate with said polymer and air flow passages formed in said die body, (b) a die tip mounted to the mounting block, having a downwardly extending elongate nosepiece of generally triangular cross-section terminating at an apex, an elongated polymer channel within said die tip, and a plurality of small-diameter polymer orifices extending through said nosepiece into said channel, said polymer channel mating with said polymer passage formed in said mounting block, and (c) elongated air plates mounted to said mounting block on either side of said die tip by mounting means allowing selection of the position of the air plates with respect to the die tip, defining converging air flow channels between the die tip and the air plates between the nosepiece and the air plates, and setback of the air plates with respect to the apex of the nosepiece said air flow channels mating with said air flow passages formed in said mounting block;

extruding a molten polymer through the orifices of the die tip in use at a meltblowing operating temperature;

preadjusting said replacement die tip assembly, by assembling said replacement die tip and air plates to said replacement mounting block, such that the replacement die tip assembly exhibits desired values for the air-gap and setback; and when it is desired to replace the die tip assembly in use with the replacement die tip assembly:
discontinuing the extrusion of the molten polymer;
removing the die tip assembly in use from the die body;
moving the replacement die tip assembly into the position previously occupied by the removed die tip assembly; and securing said replacement die tip assembly to the die body; and
recommencing extruding the polymer through the orifices of the die tip of said replacement die tip assembly.

2. The method of claim 1 comprising the further step of preheating the replacement die tip assembly to the approximate temperature of the die tip assembly in use prior to said step of moving the replacement die tip assembly into the position previously occupied by the removed die tip assembly.

3. The method of claim 2 wherein the operating temperature of the die assembly is between 350 and 900 degrees Fahrenheit, and wherein the replacement die tip is preheated to within 50 degrees Fahrenheit of the operating temperature.

4. The method of claim 3 wherein the operating temperature of the die assembly is between about 400 and about 700 degrees Fahrenheit and wherein the replacement die tip is preheated substantially to the operating temperature.

5. The method of claim 4 wherein the die assembly is maintained at the operating temperature during replacement of the die tip in use with the replacement die tip.

6. The method of claim 1 wherein the die body includes an elongate cavity formed therein and each mounting block is complementary in cross-section to the cross-section of said cavity, each mounting block with the respective die tip mounted thereon being slidable into and out of said cavity.

7. The method of claim 6 wherein the cross-section of said elongate cavity includes longitudinal support ribs extending along opposed walls of said cavity, and the cross-section of each mounting block defines elongate slots accepting said support ribs, whereby said step of moving the replacement die tip assembly into the position previously occupied by the removed die tip assembly includes the, step of sliding said replacement mounting block with the respective die tip mounted thereon into said cavity from one end thereof, such that said ribs fit in said slots of the replacement mounting block to support said replacement mounting block.

8. The method of claim 1, wherein said die block defines a cavity for receiving the die tip assembly, and said step of moving the replacement die tip assembly into the position previously occupied by the removed die tip assembly is performed by lifting the replacement die tip assembly into said cavity.

9. A die assembly for a meltblowing machine comprising:
(a) an elongated die body defining a central coathanger-shaped polymer flow passage and air flow passages on either side thereof, said die body receiving heaters for heating polymer and air flowing in said passages, said die body defining a surface for receiving a mounting block, and said polymer and air flow passages terminating at said surface for mating with corresponding passages defined by said mounting block;
(b) an elongate mounting block adapted to be received by and secured to said surface of said die body such that polymer and air flow passages in said mounting block mate with corresponding passages in said die body;
(c) a die tip adapted to be received by and secured to the mounting block and having an outwardly extending elongate nosepiece of triangular cross-section terminating in an apex, an elongate polymer channel being formed within said nosepiece for communicating with the polymer flow passage in said mounting block, and a plurality of orifices being formed in at least one row along the apex and communicating with said polymer channel;
(d) first and second air knife plates for being secured to the mounting block on opposite sides of the nosepiece and therewith defining converging air passages mating with said air flow passages in said mounting block, said air knife plates being spaced from said nosepiece by air-gaps;
(e) means for adjustably securing the air knife plates to the mounting block, said means for securing permitting adjustment of the air-gaps and set-back of the air knife plates with respect to the apex of the nosepiece; and
(f) means for clamping the mounting block with the die tip and air knife plates secured thereto to the die body and being releasable to permit the mounting block with the die tip and air knife plates secured thereto to be removed therefrom.

10. The die assembly of claim 9, wherein said die body defines a cavity for receiving said mounting block with the die tip and air knife plates secured thereto, said cavity in said die body and said mounting block defining mating shoulders and grooves, whereby said mounting block may be supported within said cavity in said die body as said mounting block is slid into said cavity from one end thereof.

11. The die assembly of claim 9 wherein said means for adjustably securing said air knife plates to the mounting block comprises means defining a plurality of selectible discrete vertical positions of the air knife plates with respect to the apex of the nosepiece, and selectible spacer members for determining the lateral positions of the air knife plates with respect to the nosepiece.

12. The die assembly of claim 11 wherein said means defining a plurality of selectible discrete vertical positions of the air knife plates with respect to the apex of the nosepiece comprises a plurality of sets of vertically and laterally spaced dowel pin receiving holes formed in one of said mounting block and each of said air plates, and a like plurality of sets of vertically aligned and laterally spaced dowel pin receiving holes formed in the other of said mounting block and each of said air plates.

13. The die assembly of claim 9, wherein said means for clamping the mounting block within the cavity in the die body comprises a plurality of compression rods spaced along the length of the die body, and adapted to urge the mounting block into engagement with the die body.

14. The die assembly of claim 13 wherein said compression rods comprise threaded members threadingly engaging the die body.

15. The die assembly of claim 9, wherein said mounting block with the die tip and air knife plates secured thereto is adapted to be lifted toward said die body to contact and be secured to said surface of said die body.

16. A meltblowing die assembly with a replaceable die tip assembly, said die assembly comprising:
1) a die body having
(a) an elongate cavity formed therein and defined by opposite inwardly facing side walls and a bottom surface, (b) an elongated coathanger-shaped polymer flow passage discharging through the bottom surface, (c) first and second air flow passages on either side of said polymer flow passage, and (d) heating means for heating polymer and air flowing in said passages; and (2) a die tip assembly, said die tip assembly comprising:

(a) an elongate mounting block being substantially coextensive with the cavity and having (i) outwardly facing side walls and an upwardly facing surface, (ii) a downwardly facing surface, (iii) a polymer flow passage extending from the upwardly facing surface to the downwardly facing surface, and (iv) first and second air flow passages extending from the upwardly facing surface to the downwardly facing surface, the mounting block being adapted to be positioned in the die body cavity (b) an elongate die tip having a triangular, downwardly converging nosepiece terminating in an apex, a row of orifices formed along the apex, an upwardly facing base surface, and a polymer flow passage extending from the base surface to the orifices, (c) air plates for being mounted on the mounting block on opposite sides of the nosepiece and therewith defining converging air passages, each defining an air gap mating with said first and second air flow passages in said mounting block; and (d) means for securing the air plates to the mounting block, said means for securing comprising means for adjusting the relative positions of the air plates with respect to the nosepiece of the die tip, to permit the presetting of the air gap defined by each of the air passages defined between said air plates and said nosepiece and the setback between the air plates and the apex;

(e) means for mounting the die tip on the mounting block, whereby the polymer flow passages of the mounting block and the die tip are secured in fluid communication; and (f) means for securing the mounting block to the die body with the die tip and air plates mounted thereon and with the air and polymer flow passages of the die body and mounting block in fluid communication, whereby release of the means for securing permits the mounting block to be secured to or be removed from the die body without disturbing the adjustment of the air plates with respect to the nosepiece.

17. The die assembly of claim 16, wherein said cavity in said die body and said mounting block define mating shoulders and grooves, whereby said mounting block may be supported within said cavity in said die body as said mounting block is slid into said cavity from one end thereof.

18. The die assembly of claim 16 wherein said means for adjustably securing the air plates to the mounting block comprises means defining a plurality of selectible discrete vertical positions of the air plates with respect to the apex of the nosepiece, and selectible spacer members for determining the lateral positions of the air plates with respect to the nosepiece.

19. The die assembly of claim 18, wherein said means defining a plurality of selectible discrete vertical positions of the air plates with respect to the apex of the nosepiece comprises a plurality of sets of vertically and laterally spaced dowel pin receiving holes formed in one of said mounting block and each of said air plates, and a like plurality of sets of vertically aligned and laterally spaced dowel pin receiving holes formed in the other of said mounting block and each of said air plates.

20. The die assembly of claim 16, wherein said means for securing the mounting block to the die body comprises a plurality of compression rods spaced along the length of the die body, and adapted to urge the mounting block into engagement with the die body.

21. The die assembly of claim 20, wherein said compression rods comprise threaded members threadingly engaging the die body.

22. The die assembly of claim 16, wherein said mounting block is adapted to be lifted into said cavity in said die body.

* * * * *